United States Patent Office.

LEO VIGNON, OF LYONS, FRANCE.

MANUFACTURE OF COLORING-MATTER FROM ALPHA-NAPHTHOL AND DINITRO-NAPHTHOL.

SPECIFICATION forming part of Letters Patent No. 324,615, dated August 18, 1885.

Application filed July 25, 1884. Renewed June 18, 1885. (No specimens.)

*To all whom it may concern:*

Be it known that I, LEO VIGNON, of the city of Lyons, in the Department of the Rhone, in France, have invented certain new and useful Improvements in the Manufacture of Coloring-Matter for Dyeing, of which the following is a specification.

I have discovered that by combining alpha-naphthol with sulphuric acid of a certain quality, treating the compound with nitric acid and neutralizing with a proper alkali, with due regard to quantities and temperature, the resulting substance will be a new yellow coloring-matter consisting of disulpho-alpha-naphthol and trinitro-alpha-naphthol combined of great practical value to the dyer. I have thereby made an improvement in the arts and reduced it successfully to practice, as follows:

Heat to or near the boiling-point of water for eight or ten hours a mixture of thirty pounds alpha-naphthol, dry and finely pulverized, and one hundred and eighty pounds sulphuric acid, at 66° Baumé. The product becomes liquid after a little time. Add to this three hundred pounds of pure ice, which will both lower the temperature and produce a just sufficiently dilute solution. To this dilute solution is added little by little ninety pounds of nitric acid at 40° Baumé, taking care to not exceed the temperature of 30° centigrade during the reaction. Afterward heat it to near 40° centigrade, cool to ordinary temperature, 12° or 15° centigrade. Then the mixture is filtered and the precipitate subjected to a strong pressure.

The precipitate is redissolved in two hundred pounds of boiling water and again filtered. Now, the liquid of filtration is the valuable portion, and which is a disulpho-alpha-naphthol combined with trinitro alpha-naphthol. To it is added five hundred pounds of water saturated at a temperature of 50° to 60° centigrade with thirty pounds of carbonate of potash. The product thus obtained is allowed to cool to 15° centigrade and filtered to extract the precipitate, which is pressed and dried, and constitutes the desired yellow coloring-matter.

It will be seen that I employ for the preparation of the disulpho-alpha-naphtholic acid, sulphuric acid at 66° Baumé, (monohydrated sulphuric acid,) avoiding the use of anhydrous acid or of fuming sulphuric acid, constituting an important change from any process previously known to me in the preparation of disulpho-alpha-naphtholic acid and analogous acids.

I claim as my invention—

The process herein described of producing coloring-matter, the same consisting in treating alpha-naphthol with sulphuric acid at 66° Baumé until a liquid product is obtained, then adding pure ice to reduce the temperature and dilute the solution, then adding nitric acid at 40° Baumé, keeping the temperature under 30° centigrade, then heating the solution to near 40° centigrade, then cooling to 12° or 15° centigrade, and finally filtering, redissolving the precipitate, and treating with carbonate of potash in solution to produce a precipitate, which is pressed and dried, substantially as in the manner specified.

In testimony whereof I have signed this specification in the presence of two subscribing witnesses.

LEO VIGNON.

Witnesses:
M. P. PEIXOTTO,
JEAN P. A. MARTIN.